(12) United States Patent
Caveney et al.

(10) Patent No.: US 6,718,674 B2
(45) Date of Patent: Apr. 13, 2004

(54) APPARATUS AND SYSTEM FOR IDENTIFICATION LABELING

(75) Inventors: Jack E. Caveney, Hinsdale, IL (US); John J. Bulanda, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/103,231

(22) Filed: Mar. 21, 2002

(65) Prior Publication Data

US 2003/0177676 A1 Sep. 25, 2003

(51) Int. Cl.[7] .................................................. G09F 3/18
(52) U.S. Cl. ........................ 40/642.02; 40/611; 40/649; 439/491
(58) Field of Search .............................. 40/299.01, 611, 40/649, 642.02, 661, 663, 668, 622, 337, 338; 439/488, 491

(56) References Cited

U.S. PATENT DOCUMENTS

| 1,930,610 | A | | 10/1933 | Despard |
| 4,707,564 | A | | 11/1987 | Gonzales |
| 4,780,573 | A | | 10/1988 | Own |
| 5,212,899 | A | | 5/1993 | Fandreyer |
| 5,217,190 | A | | 6/1993 | Reed et al. |
| 5,362,254 | A | * | 11/1994 | Siemon et al. ............... 439/491 |
| 5,419,715 | A | | 5/1995 | Laveissiere |
| 5,594,206 | A | * | 1/1997 | Klas et al. ..................... 174/56 |
| 5,613,874 | A | | 3/1997 | Orlando et al. |
| 5,620,335 | A | * | 4/1997 | Siemon ....................... 439/491 |
| 5,735,708 | A | * | 4/1998 | Arnett et al. ................. 439/491 |
| 5,774,542 | A | * | 6/1998 | Casey et al. .................. 40/661 |
| 5,807,139 | A | * | 9/1998 | Volansky et al. ............. 439/491 |
| 5,977,481 | A | | 11/1999 | Worrell et al. |
| 6,172,301 | B1 | | 1/2001 | Goodsell |
| 6,215,067 | B1 | | 4/2001 | Chen |
| 6,421,941 | B1 | * | 7/2002 | Finke et al. ................... 40/611 |

* cited by examiner

Primary Examiner—Gary Hoge
(74) Attorney, Agent, or Firm—Robert A. McCann; Christopher S. Clancy; Aimee E. McVady

(57) ABSTRACT

An identification labeling system comprising a faceplate with a recess and a label cover that may be retained within the recess. The label cover may have compartments for retaining identification labels. The label cover has latching legs and the recess has a complementary retention ledge. A lift slot may be provided to facilitate removal of the label cover. The recess may contain holes to accommodate individual molded identification icons. The recess may include tapered corners to accommodate strip labels of different widths and lengths, such labels being positioned by the tapered corners of the recess and the label cover. The recess includes end configurations that prevent a label from passing through the surface of the faceplate. The label cover has a thickness so as to be flush with the faceplate. The label may be the same color as the faceplate.

44 Claims, 8 Drawing Sheets

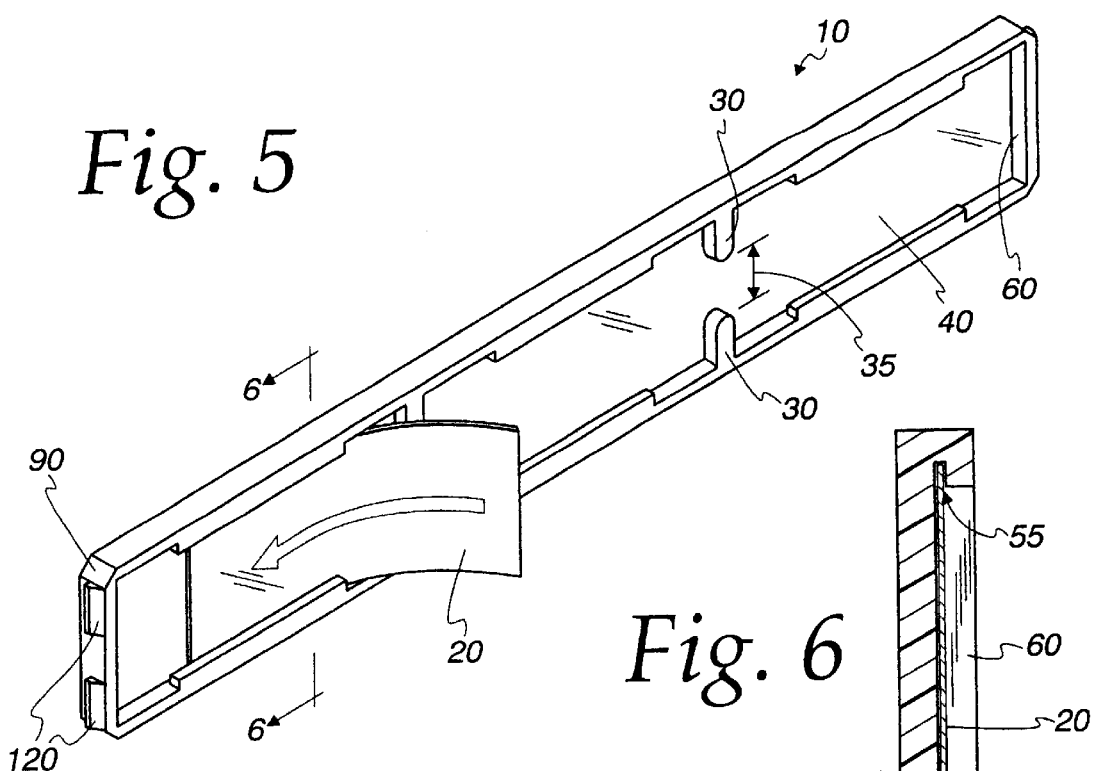
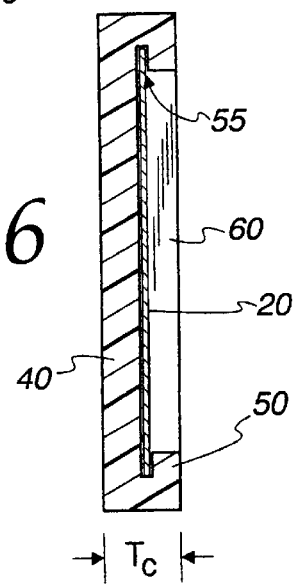
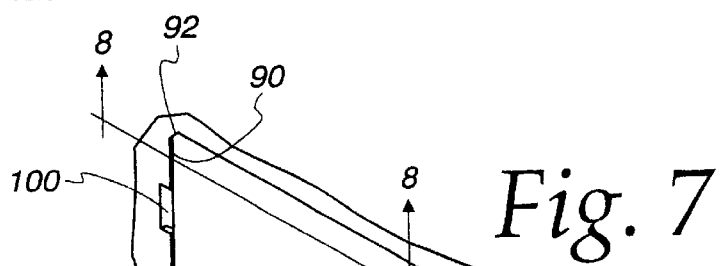
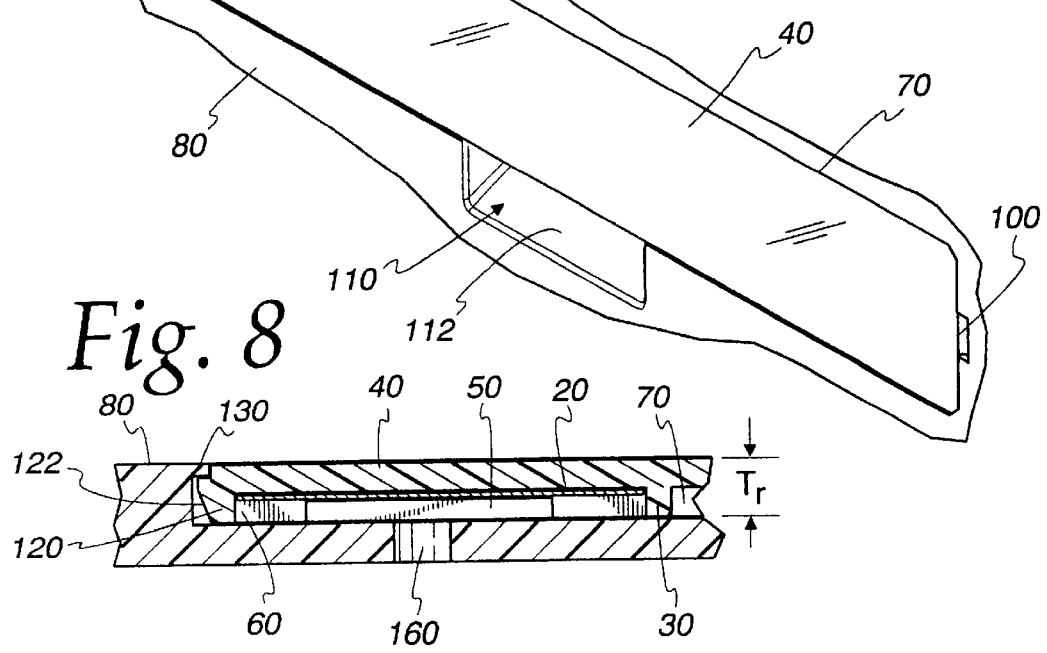

APPARATUS AND SYSTEM FOR IDENTIFICATION LABELING

FIELD OF THE INVENTION

The present invention relates generally to the identification labeling of communication and network ports, and relates more particularly to a labeling system that is versatile, accommodates revisions of labeling and can be used to identify multiple adjacent ports.

BACKGROUND OF THE INVENTION

Communication systems and computer networks are becoming increasingly sophisticated, and each system attempts to accommodate more and more users and peripherals. As a result, a typical system may include a large array of patch panels or similar hardware configurations with hundreds of individual ports for accommodating hundreds of interconnections to a communication server or network. Appropriate identification of each port is critical to maintain a properly configured system. When a port is reconfigured, or a user or peripheral device is changed, the identification of the port should also be changed, typically referred to as a revision process.

A number of prior art identification labeling techniques have been proposed. Perhaps one of the most common systems is also one of the most rudimentary. On the faceplate of a patch panel or other hardware that provides a port for interconnection, a conventional rectangular adhesive sticker may be applied in the vicinity of the port to which it identifies. Such a sticker is typically supplied from a label stock that includes an adhesive backing. In use, the appropriate identification information is inscribed on the face of the sticker, typically by printing with a printer or by manually using a pen, and a backing is removed to expose the adhesive and the sticker is manually applied in the desired location on the faceplate of a panel that includes the port.

Such a conventional technique has many disadvantages. Such a conventional sticker provides no protection for the surface of the sticker such that smudging of the identification information on the sticker may occur during application, and may also occur inadvertently during cleaning or contact with the surface of the sticker. Application of the sticker must be precise, and requires fine manual dexterity. This problem is frequently compounded when the panel is disposed such that visibility and physical access to the ports may be obstructed, such as when the panel is located in a closet, near a wall, under a desk or another relatively inconvenient location.

Another disadvantage of such a conventional sticker is that, over time, the adhesive quality of the sticker may deteriorate and the sticker—and the identification of the port—may be lost, particularly if the panel is exposed to heat or humidity. Another disadvantage is that such a conventional sticker does not accommodate a revision process. In other situations, old stickers can be difficult or impossible to remove. If a new sticker is placed on top of an old sticker, the adhesive integrity may be deficient and the sticker may be inadvertently removed.

Another conventional prior art labeling technique involves providing a rectangular recess in a panel to accommodate a rectangular paper label. This prior art labeling technique is generally illustrated in FIGS. 1–4. In some cases the paper label may be covered with a clear plastic shield for protection. As seen, however, the design maintains a slot that is open at one or both ends. Thus, as depicted in FIG. 4, when inserting the label and sleeve, there is a tendency for the label 220 to slide beyond the end of the recess and into the slot behind the bottom wall, sometimes resulting in losing the label or misaligned placement of the label that obscures identification information.

U.S. Pat. No. 5,613,874 to Orlando et al. discloses another identification labeling technique where a snap-in designation strip may be attached to the front of a faceplate. As illustrated in FIG. 2 of Orlando et al., a paper label protected by a clear plastic cover may be inserted into a groove. The strip is attached to and extends from the surface of the faceplate by means of tabs, each having two arms, disposed on the back of the strip and which may be inserted into corresponding slots of the faceplate. Since the strip would be irremovable once attached to the faceplate, the grooves must be open-ended to allow for changes to the labeling. Among some of the disadvantages of the Orlando et al. technique are that, similar to other prior art techniques, the label could be easily disengaged through inadvertent contact that slips the label within the grooves. Also, as seen from FIG. 2 of Orlando et al., the technique is relatively cumbersome, requiring significant manual dexterity to envelop the paper label with the plastic cover and insert that assembly into the groove. In addition, if the labeling is being performed as part of a revision process, the paper label and plastic cover assembly must be inserted into the groove while the strip is attached to the faceplate because the design of the arms does not allow for removal of the strip once attached to the faceplate. Thus, if the faceplate is disposed in a location with restricted physical access, insertion of a new label for a revision process may be very difficult. Furthermore, since the Orlando et al. technique requires one paper label for designation of multiple ports, during a revision process the identification information for both ports would need to be printed again on a new label, even if the designation information for only one of the ports was being updated.

In view of the aforementioned deficiencies and disadvantages of prior art identification labeling techniques, there is a need for an improved identification labeling system that is versatile, conveniently accommodates revisions, and provides suitable protection for a plurality of different types of identification labels.

SUMMARY OF THE INVENTION

It is therefore an object of the present invention to provide an improved and versatile identification labeling system.

It is another object of the present invention to provide an identification labeling system that when assembled remains flush with the surface of the faceplate to which it is attached.

It is another object of the present invention to provide an identification labeling system that can accommodate identification labeling of multiple adjacent ports. It is a related object of the present invention to provide such an identification labeling system where the information pertaining to just one of the multiple ports can be revised without having to reprint the information pertaining to the other ports.

It is a further object of the present invention to provide an identification labeling system that will accommodate a plurality of different types and sizes of labels each of which could identify multiple adjacent ports. It is a related object of the present invention to provide such an identification labeling system that will accommodate narrower labels that may be printed with a printer, as well as wider labels that may be marked by hand.

It is another object of the present invention to provide an improved and versatile identification labeling system that can accommodate a variety of different non-adhesive labels.

It is another object of the present invention to provide an improved and versatile identification labeling system that can accommodate both paper labels and icon identification tabs.

The above objects and advantages are realized in the present invention that provides an improved and versatile identification labeling system. In connection with the invention, there is a pocket or recess provided on a faceplate or other surface that accommodates a label cover. The label cover is preferably clear or translucent and may be fabricated from plastic. The pocket has closed ends of a configuration to accommodate a latch disposed on the label cover to retain the label cover and the identification label. The label cover is preferably of a thickness such that it is flush with the surface of the faceplate when disposed in the recess. A lift slot may be provided in the faceplate next to the recess to facilitate removal of the latched label cover, for example, during a revision process. The recess also may include holes to accommodate individual molded identification icons. The label cover may accommodate individual labels into compartments within the cover where the labels are inserted into one or more slots defined by the face of the cover and a pair of longitudinally extending guide members. Fingers may be provided to separate different segments of the cover.

Several different types of labels may be used with the invention. First, individual segment labels may be inserted into the slots corresponding to different segments of the label cover, which may then be secured in the recess. Identification information for these individual segment labels may be provided by printing from a desktop or portable printer. Second, a strip label which is almost as long as the recess but is the same height as an individual segment label may be inserted directly into the recess and is retained by the label cover which may or may not contain segments. In this case, the back surfaces of the label cover retains the strip label when the cover is latched into the recess of the faceplate. Identification information for this type of label may be printed with a desktop or portable printer. In addition, a slightly higher and slightly shorter strip label may be used with the present invention that could accommodate identification information inscribed on the strip label by hand. Alternatively, holes in the recess may accommodate individual molded identification icons where, for example, a split ball disposed at the back of the icon serves as a retention latch when it is inserted into the hole in the pocket. In addition, the versatility of the present invention may allow for a variety of combinations of the different types of labeling schemes to be used together.

As may be apparent to one of skill in the art, in accordance with the present invention, the individual segment labels and the strip labels that may be printed on a printer and are of one common relatively small height, allowing for printing both types of labels from the same portable printer with the same roll or cartridge of label stock. The advantage of the present invention facilitates revision of the identification information. When the labels are printed in the field using a portable printer, segment and strip labels of various lengths of the same and common height is important to prevent the need to carry and install a variety of different types of label stock having different heights. The relatively narrow height of the segment labels and the strip labels, particularly when printed on a printer, provides superior appearance.

BRIEF DESCRIPTION OF THE DRAWINGS

Other objects and advantages of the invention will be apparent from the following detailed description and the accompanying drawings, in which:

FIG. 5 is a perspective view of one embodiment of the label cover according to the present invention, illustrating insertion of one segment identification label into the label cover;

FIG. 6 is a cross-sectional view of the label cover of FIG. 5 taken along section line 6—6;

FIG. 7 is a perspective view of one embodiment of the present invention illustrating the label cover latched into a recess of a faceplate;

FIG. 8 is a cross-sectional view of the label cover with a segment label installed latched into the recess of a faceplate of FIG. 7 taken along section line 8—8;

Figure 1:
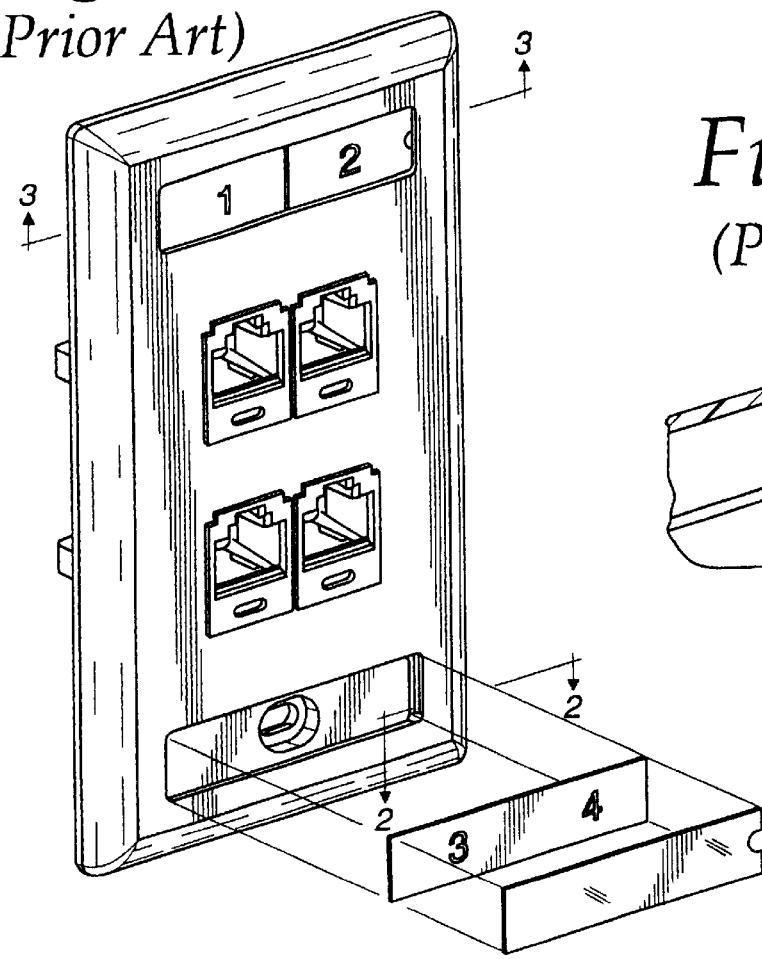
FIG. 1 is a perspective view of a prior art labeling system.
Figure 2:
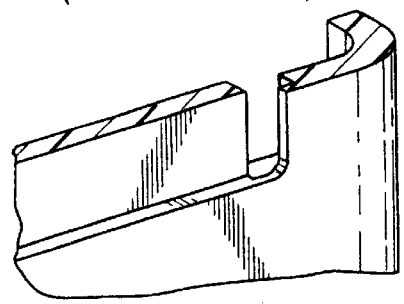
FIG. 2 is a cross-sectional view of the open slot of the prior art labeling system of FIG. 1, taken along section line 2—2.
Figure 3:
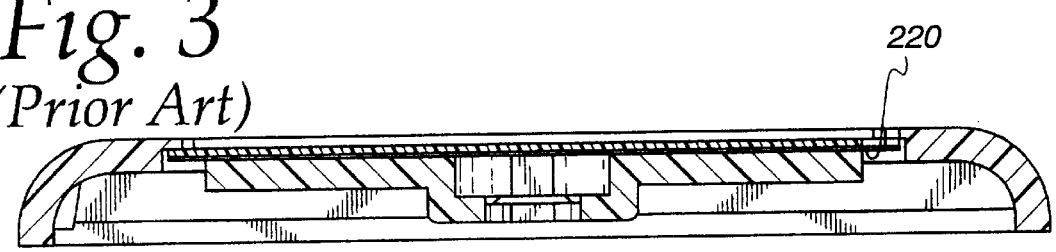
FIG. 3 is a cross-sectional view of the recess containing a label of the prior art labeling system of FIG. 1.
Figure 4:
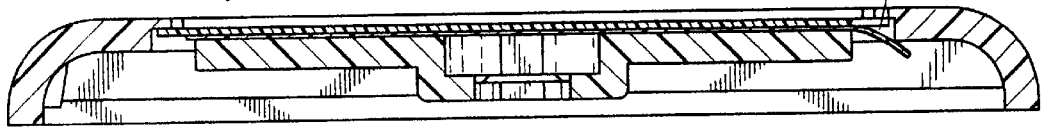
FIG. 4 is another cross-sectional view similar to FIG. 3 that illustrates a label sliding into the slot beyond the end of the recess.

While the invention is susceptible to various modifications and alternative forms, certain preferred embodiments are shown by way of example in the drawings and will herein be described in detail. It should be understood, however, that it is not intended to limit the invention to the particular forms described, but to the contrary, the invention is intended to cover all modifications, alternatives and equivalents falling within the spirit and scope of the invention as defined by the appended claims.

DETAILED DESCRIPTION OF THE INVENTION

Turning first to FIGS. 5 and 6, there is illustrated an elongated and generally rectangular label cover 10 and a generally rectangular segment label 20 in accordance with one embodiment of the present invention. As will be apparent, the present invention is very versatile and can accommodate several different identification labels. Initially illustrated is an example of the invention used to accommodate individual segment labels 20. The particular label cover 10 illustrated in FIG. 5 is of the multi-segment variety, comprising three separate segments, each of which corresponds to one of three adjacent ports on a faceplate (not shown) into which the label cover 10 may be retained. The multi-segment variety of label cover 10 illustrated is shown merely by way of example, and the advantageous features of the invention may be realized in connection with a simple one-segment label cover, as well as with different multi-segment label covers having, for example, 2 or 4 or more adjacent segments corresponding to a similar number of adjacent ports.

In the multi-segment label cover 10 illustrated, the various segments are delineated by transversely extending pairs of fingers 30 which serve as a label stop during insertion of a segment label 20 into the cover. Alternatively, the transversely extending pairs of fingers 30 could also take the form of a single member extending transversely from one edge of the label cover 10 to the other edge of the label cover 10. However, a preferred arrangement is to provide pairs of fingers 30, as illustrated, or a similar arrangement, because the gap 35 between the fingers 30 allows for the blade of a screwdriver or other tool to be inserted therebetween to facilitate removal of a label 20 retained within the label cover 10. The label cover 10 is provided with a front protective shield 40 which is preferably either transparent or translucent so that identification information printed, written or otherwise inscribed upon the segment label 20 will be visible through the protective shield 40. According to an alternative embodiment of the invention, when no identification information is necessary, the front protective shield may be opaque or colored to match the color of the faceplate.

The label cover 10 preferably includes a pair of opposed longitudinally extending guide members 50 that are slightly spaced apart from the protective shield 40, thereby forming a slot 55 that is wider than the width of the segment label 20. Such a pair of guide members 50 may be provided for each segment of a multiple segment label cover 10, as illustrated. At each end surface 60 of the label cover 10 is provided an end surface 60 that serves as a label stop. Thus, for each segment, the pair of guide members 50 and a pair of label stops, provided either by an end 60 of the label cover 10 or a pair of fingers 30, defines a compartment within which a segment label 20 may be retained. As shown, the guide members 50 do not extend all the way to the fingers 30 or the end surface 60, so that there is a passage within which the segment label 20 may be inserted into the compartment of a segment by slightly bending the segment label 20 and sliding it into the slot 55 defined by the guide members 50.

FIG. 5 illustrates that the segment label 20 may be inserted in the direction of the arrow, and, alternatively, the segment label 20 may also be inserted in the other direction in the passage defined between the guide members 50 and the associated end surface 60. Similarly, a segment label 20 may be inserted into the middle segment in either direction by sliding a segment label 20 in the passage defined between the guide members 50 and the associated fingers 30. As illustrated, the corners of the label cover 10 may be chamfered 90 and provided with latching legs 120 to facilitate insertion into a recess of a faceplate having complementary chamfers 92 and retention ledges 130, as described in more detail below.

In order to be maintained with integrity within the compartment of a segment, the segment label 20 should be of predetermined dimensions such that its length is slightly less than the distance between the label stops defined either by the fingers 30 or the end surface 60, its width is slightly less than the distance between the opposed slots 55 defined by the guide members 50 and its thickness is slightly less than the distance between the guide members 50 and the protective shield 40. The segment labels 20 may be fabricated from a wide variety of paper, plastic, fabric or other materials onto which identification information may be inscribed. Preferably, the segment labels 20 will be at least slightly flexible so as to facilitate insertion into a compartment of a segment of a label cover 10.

The label cover 10 may be fabricated from a single unitary element, such as a molded plastic element. Alternatively, the label cover 10 may be assembled from different elements, such as a separately fabricated protective shield 40 that may be glued, laminated or otherwise adhered to a frame constituting the remaining features of the label cover 10 (e.g., the fingers 30, the guide members 50, and the end surfaces 60). Whether unitary or multiple-piece construction, it is usually preferred that the protective shield 40 is transparent or at least translucent so that the identification information inscribed upon a label may be visible through the protective shield 40. In addition, it is preferred that the label cover 10 be fabricated from a material that is somewhat flexible and resilient, such as polycarbonate or other non-brittle engineering quality plastic. Such qualities for the label cover 10 are preferred so that the label cover 10 may sustain some degree of flexing during insertion and removal into a complementary recess of a faceplate, while still retaining its original shape after flexing.

Turning now to FIG. 7, there is illustrated the manner in which the label cover 10 may be fitted into a complementary recess 70 of a faceplate 80 for which identification is desired. While specific preferred features for retaining the label cover 10 within the faceplate recess 70 will be described in the following, it should be apparent that a wide variety of other alternative latching arrangements could be utilized that are still within the scope of the present invention. According to a preferred embodiment of the invention as illustrated in FIG. 6, FIG. 7 and FIG. 8, the depth $T_r$ of the recess 70 is substantially the same as the thickness $T_c$ of the label cover 10 so that the front of the protective shield 40 of the label cover 10 is flush with the surface of the faceplate 80. The flush fitting of the label cover 10 with respect to the surface of the faceplate 80 is an advantageous feature of a preferred embodiment of the present invention's recessed label cover because it improves the appearance, eliminates a pocket which can collect foreign material and it decreases the depth of the recess in the faceplate which enhances faceplate design. For example, minimum faceplate thickness of a screw mounted faceplate is determined by the depth of the label cover which covers the screws.

As also seen from FIG. 7, the corners of the label cover 10 and the faceplate recess 70 may be provided with complementary chamfers 90 and 92, to promote and facilitate alignment during the process of insertion of the label cover into the faceplate recess 70 and as will be described in detail subsequently, to accommodate two different strip labels which are approximately as long as the label cover but which have different heights. Grooves 100 may be provided at either or both ends of the faceplate recess 70 to allow for a tool, such as a screwdriver, to be inserted and remove a label cover 10 that may be latched into the faceplate recess 70. In addition, a larger lift slot 110 may be provided in the panel 80 adjacent to one side of the faceplate recess 70. The lift slot 110, which may extend to the back wall of the faceplate recess 70 or may even extend completely through the faceplate 80, may be advantageously provided with an angled surface to facilitate removal of a latched panel cover 10 by finger or by a tool.

Turning now to FIG. 8, when the label cover 10 is latched into the faceplate recess 70, the segment label 20 is maintained in position by the protective shield 40, the slot 55 defined by the guide members 50 and the label stops provided at one end by the fingers 30 and at the other end by the end surface 60 of the label cover 10. So that the label cover 10 may be retained within the faceplate recess 70, a latching arrangement is provided which, as illustrated by way of example in FIG. 8, includes a pair of latching legs 120 disposed on the ends of the label cover 10 which engage with a retention ledge 130 extending from the faceplate 80 at the end of the faceplate recess 70. In order to facilitate latching of the label cover 10 into the faceplate recess 70, the latching legs 120 include a slight bevel 122. The bevel 122 of the latching leg 120, acting against the retention ledge 130 of the faceplate 80, will cause the label cover 10 to bend slightly as the label cover 10 is pressed into the recess 70 and the latching leg 120 is engaged behind the retention ledge 130. A label cover 10 that is latched into the faceplate recess 70 may be removed by inserting a tool into the groove 100 or lift slot 110, thereby slightly flexing or bending the label cover 10 such that the latching leg 120 is released from behind the retention ledge 130.

The present invention is illustrated in FIGS. 9–12 in connection with an alternative arrangement for retaining a different type of label, a strip label 22a or 22b, that spans that entire length of the faceplate recess 70 instead of fitting into an individual compartment for a segment of the label cover 10. According to this arrangement, the label cover 10 previously described may still be used, and serves to retain the strip label 22a or 22b in the faceplate recess 70. The length of the strip label 22a or 22b is preferably larger than the segment label 20 that may be inserted into a particular segment of the label cover 10. The dimensions of the strip label 22a or 22b are slightly less than the internal dimensions of the faceplate recess 70. In addition, according to an advantageous feature of the present invention, the faceplate recess 70 is preferably fabricated such that the ends 132 of the recess 70 are substantially closed so as to serve as a label stop for a strip label 22a or 22b that may be inserted directly into the recess 70 and is retained between the label cover 10a and the back wall 134 of the recess. Such a strip label 22a is preferably printed on a printer and may be long enough to identify one or more adjacent ports. Such a strip label 22b may be preferred in situations where the labels must be marked by hand because the height of the strip label 22b is somewhat larger than the height of strip label 22a and segment label 20.

Figure 10:
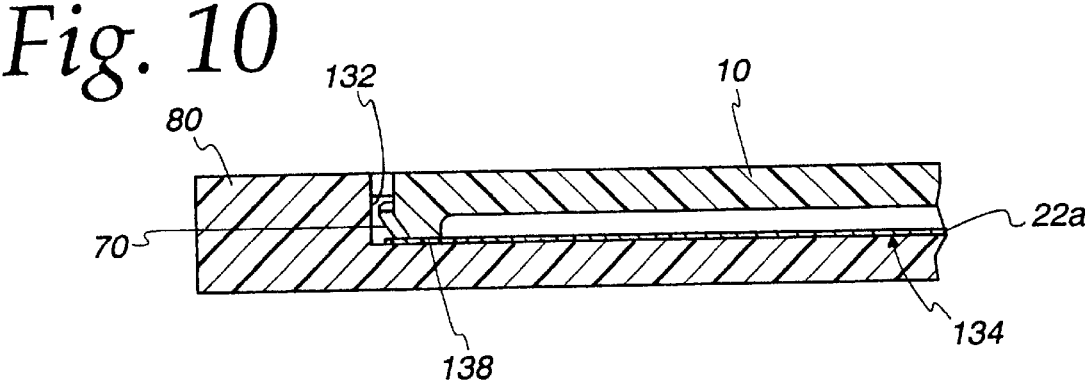
FIG. 10 is a cross-sectional view of the label cover and strip label of FIG. 9 when latched into a faceplate, taken along section line 10—10.
Figure 11:
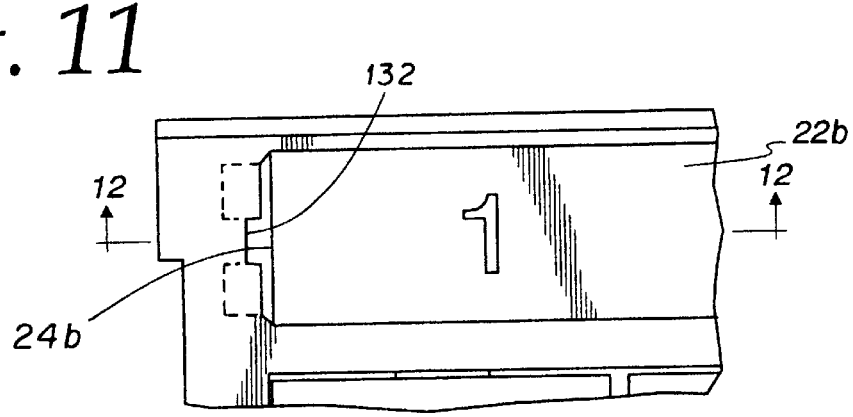
FIG. 11 is a top view of a faceplate recess with a full height strip label printed by hand installed.

The back surfaces of the fingers 30, and the guide members 50 as well as the back surfaces 138 of the edges of the label cover 10 as shown in FIG. 10 serve as a surface to retain the strip label 22a or 22b within the faceplate recess 70. As seen from FIG. 10 and FIG. 12, the latching arrangement of the label cover 10 and the recess 70 may be the same as illustrated in connection with FIG. 8. However, in this arrangement, the strip label 22a or 22b is maintained between the back of the label cover 10 and the bottom or back wall 134 of the recess 70. The strip label 22a or 22b may be marked or inscribed with identification information for ports that are provided on the faceplate 80. The strip label 22a or 22b may span the length of a multi-segment label cover 10, and identification information may be inscribed on the strip label 22a or 22b pertaining to separate segments or more generally to the group of segments for the strip label 22a or 22b.

Figure 9:
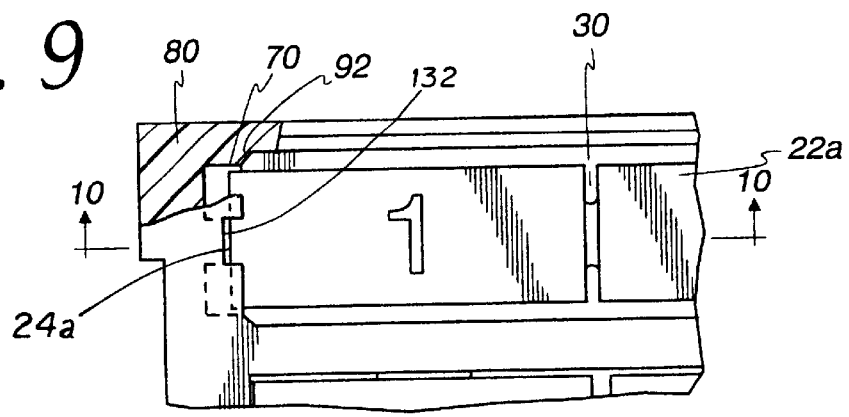
FIG. 9 is a top view of a faceplate recess with a relatively small height strip label printed by a printer installed.

As shown in FIGS. 9–12, there is illustrated strip labels of two different dimensions that may be accommodated into a faceplate recess 70 in accordance with the present invention. In each of these figures, line 24a or 24b indicates the end of the respective strip label 22a or 22b. FIG. 9 illustrates the faceplate recess 70 when it accommodates a strip label 22a that is slightly longer and slightly narrower than the strip label 22b of FIG. 11. In particular, the strip label 22a illustrated in FIG. 9 has a width that is slightly less then the total width of the recess 70, which allows it to extend past the outer tapered corners of chamfers 92. The strip label illustrated in FIG. 9 extends near the end wall 132 of the recess 70. In this arrangement, the longitudinal movement of the strip label 22a is limited by the end wall 132 of the recess 70. The strip label 22b illustrated in FIG. 11, on the other hand, has a length which is slightly less than and a width slightly greater than the strip label 22a illustrated in FIG. 9. The strip label 22b illustrated in FIG. 11 has a width which is slightly less than the total width of the recess, and has a length such that it extends just up to the point where the chamfers 92 meet the side of the recess 70. In this arrangement, the longitudinal movement of the strip label 22b is limited by the inner tapered corners of chamfers 92.

Figure 13:
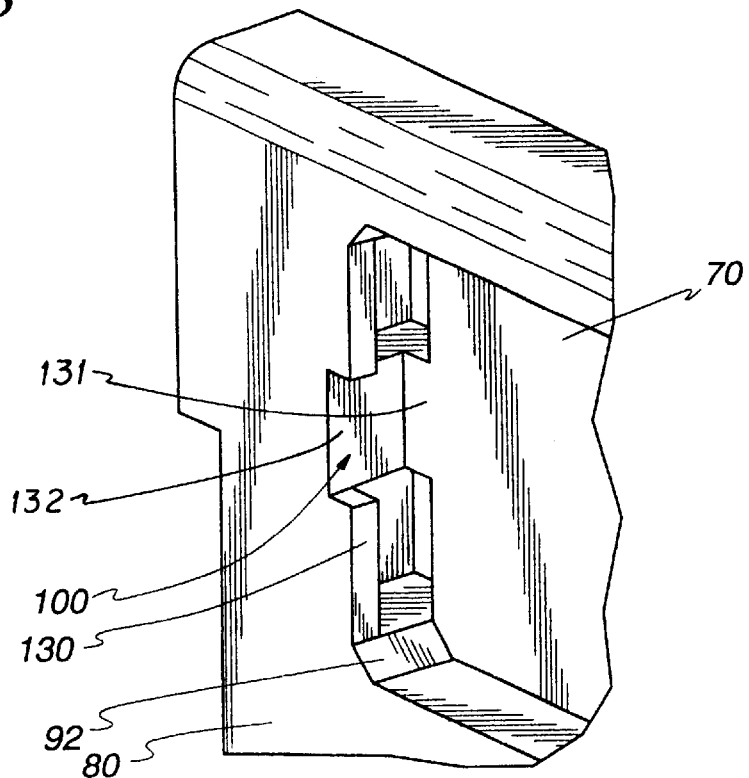
FIG. 13 is an enlarged view of one end of the faceplate recess in accordance with the present invention.
Figure 13A:
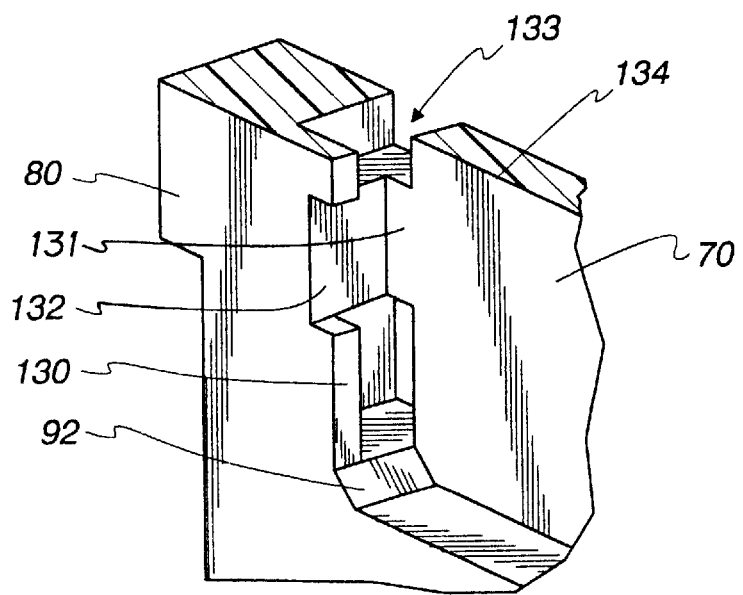
FIG. 13A is a cross-sectional views of FIG. 13 taken at respective section lines.

Turning now to FIGS. 13, and 13A, there is illustrated the manner in which a faceplate recess 70 may be fabricated into a faceplate 80 to provide the latching features of the present invention. FIG. 13 illustrates features of the end of a faceplate recess 70, and FIG. 13A illustrates a cross-sectional view of FIG. 13. The corners of the recess 70 are preferably provided with chamfers 92 to guide the insertion of a label cover 10, and may also guide the positioning of a strip label 22a inserted into the recess 70 which will be retained in the recess 70 by a label cover 10. A groove 100 may be provided to accommodate a blade of a screwdriver or other tool to facilitate removal of a label cover 10 that may be latched into the recess 70. The end of the faceplate recess 70 is also provided with a retention ledge 130 that interacts with latching legs 120 on a label cover to latch the label cover 10 into the recess. In order to facilitate fabrication of the faceplate 80 to provide the preferred features of the present invention, the retention ledges 130 may be fabricated through a pair of core outs 133 that extend through the back side of the faceplate 80. In this regard, the faceplate material located under the retention ledge 130 is removed through a pair of core outs 133, while a centrally located endwall 132 between the pair of core outs 133 remains which in combination with the backwall 134 define the end of the recess 70. As should be evident, while a core out 133 at the end of the recess may provide an aperture that extends into the recess, the centrally located endwall 132 between the pair of core outs and the backwall surface 134 of the recess 70 prevents any label from sliding into the core outs and sliding behind the faceplate, a problem that has been present with various prior art identification labeling systems. Thus, through such a core out fabrication technique the desired features of the present invention may be manufactured into an otherwise conventional faceplate.

Figure 14:
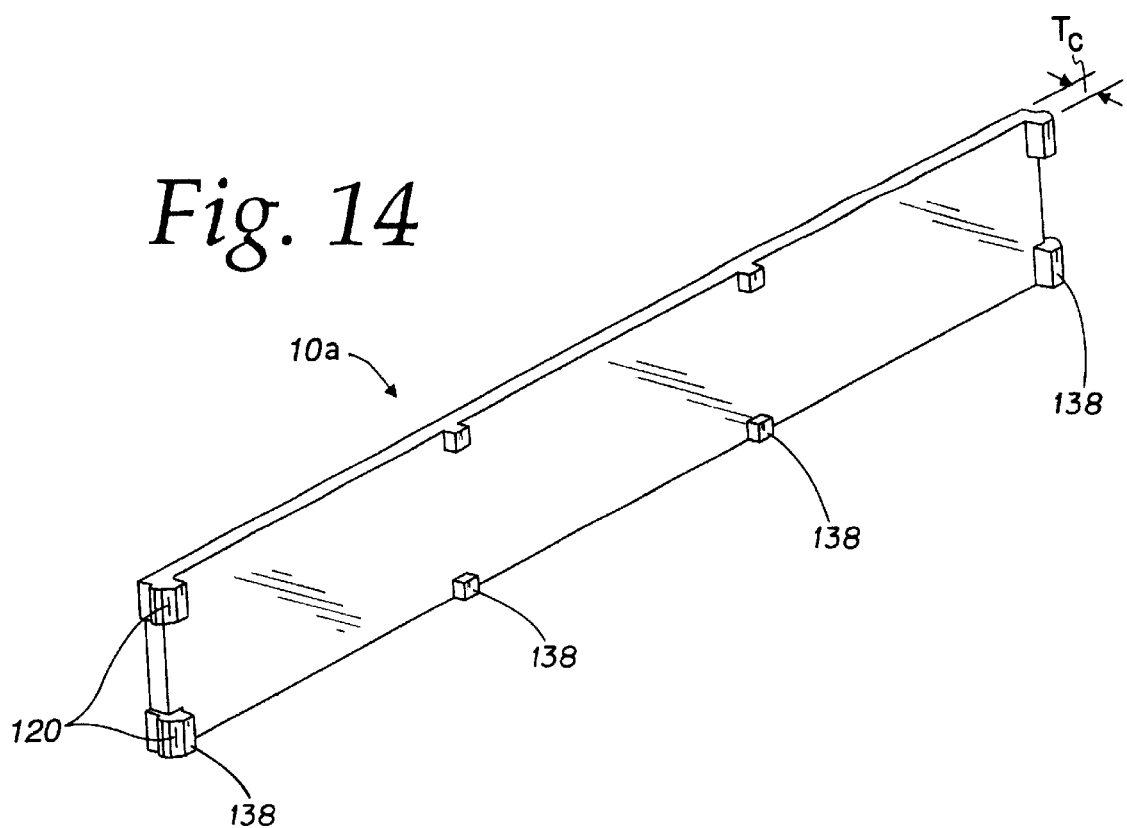
FIG. 14 is a label cover similar to that illustrated in FIG. 5 but with no recesses for individual segment labels.
Figure 18:
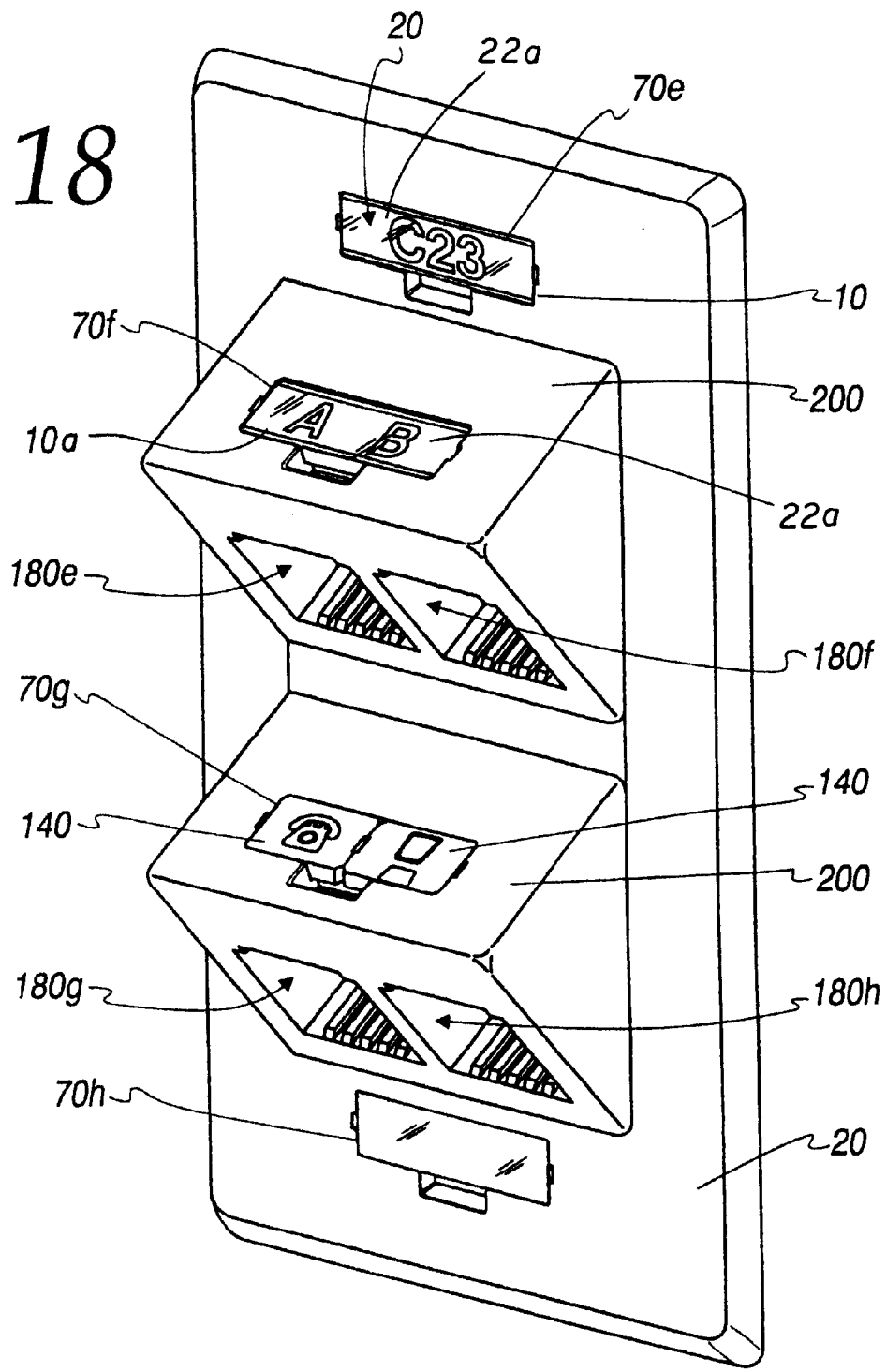
FIG. 18 is a perspective view of a sloped faceplate illustrating various features and labeling alternatives in accordance with the present invention.
Figure 19:
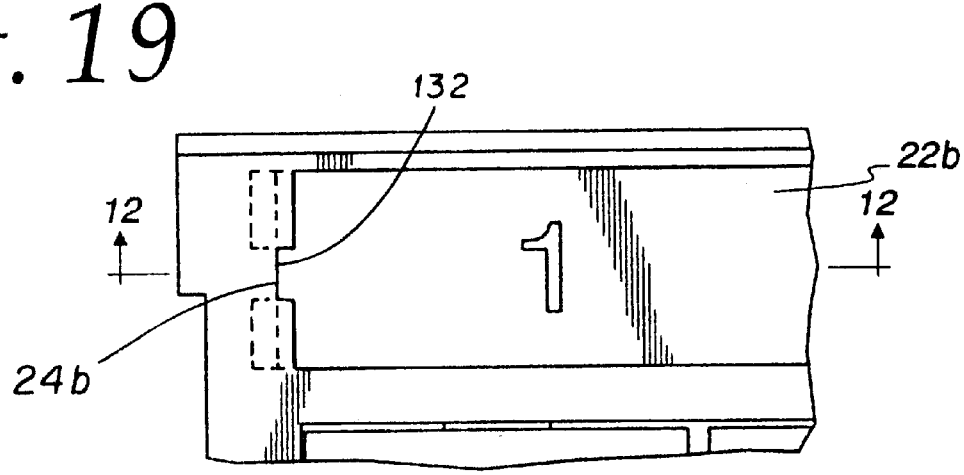
FIG. 19 is a top view of another embodiment of a faceplate recess with a full height strip label printed by hand installed.
Figure 20:
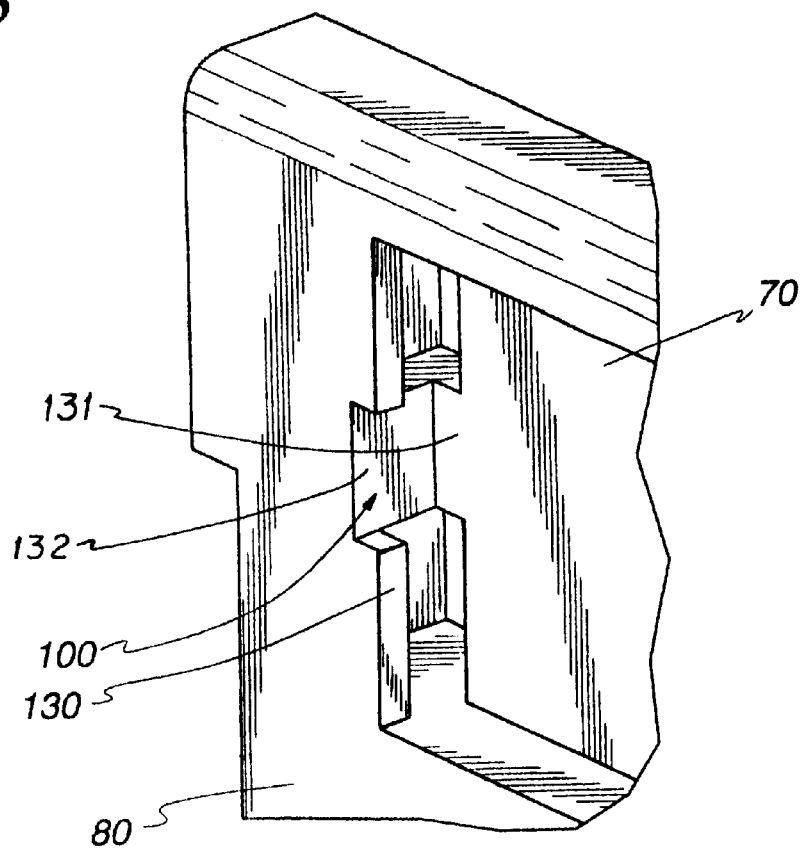
FIG. 20 is an enlarged view of one end of the faceplate recess of FIG. 19 in accordance with the present invention.

Turning now to FIG. 14, there is shown an alternative embodiment of the present invention where there is provided a label cover 10a that is the same as label cover 10 except that it is fabricated without the various features, such as the chamfer 92, fingers 30, gap 35, guide members 50 and slot 55, used to accommodate segment labels 20. This embodiment of the label cover 10a of the present invention may be used to retain a strip label 22a or 22b in a manner similar to that illustrated in FIGS. 9–12, where the back of the label cover 10a includes a plurality of platform sections 138 disposed at various locations including each lateral end which make the label cover 10a have a thickness substantially the same as the depth of the recess less the thickness of the label so as to press a strip label 22a or 22b against the back wall 134 of the recess 70. FIGS. 19 and 20 show embodiments of the faceplate recess that would accommodate the label cover 10a of FIG. 14. In such an arrangement, the label cover 10a is transparent or translucent to display identification information on the strip label 22a or 22b, as illustrated in connection with recess 70e of FIG. 18. Alternatively, this embodiment of the present invention may also be used where the label cover 10a is merely retained in the recess itself without a strip label 22. In such a case, the label cover 10a may be opaque and may be of a color that matches the color of the faceplate 80, as illustrated in connection with recess 70h of FIG. 18.

Figure 15:
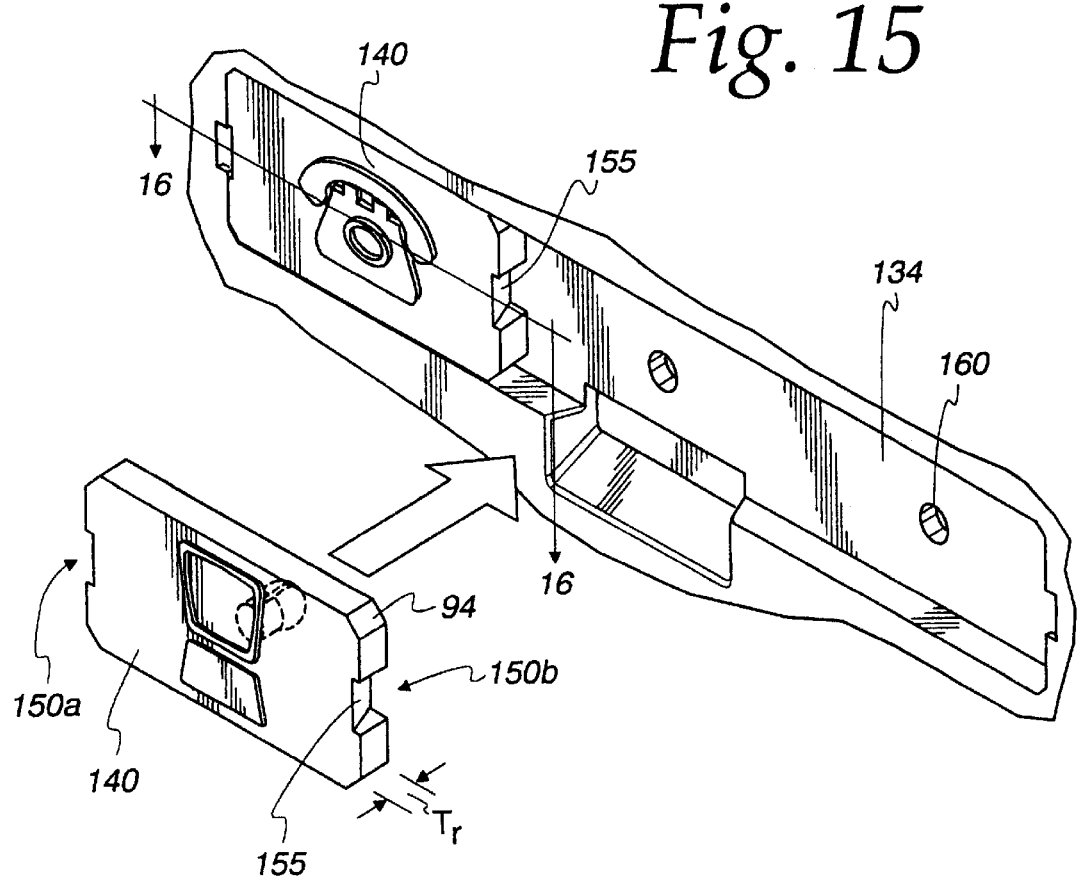
FIG. 15 is a perspective view of the faceplate recess in accordance with the present invention, illustrating the accommodation of individual icon identification elements.
Figure 16:
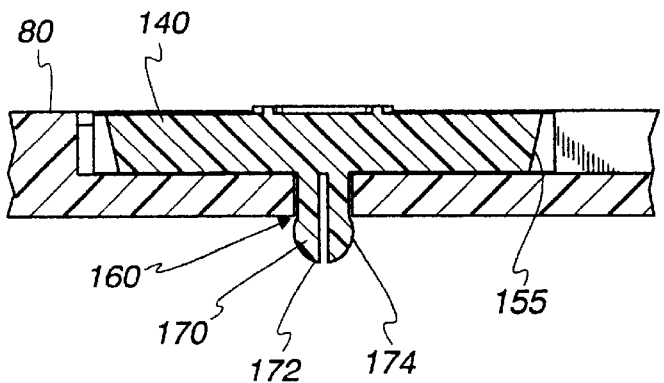
FIG. 16 is a cross-sectional view of the faceplate recess and icon identification element of FIG. 15 taken along section line 16—16.

Turning now to FIGS. 15 and 16, there is illustrated another arrangement for port identification in connection with the present invention. In this arrangement, individual icon elements 140a and 140b may be inserted into the faceplate recess 70 to provide identification information for an associated port. The icon elements 140 may be fabricated from plastic or other suitable material and preferably have a thickness $T_i$ substantially the same as the depth $T_r$ of the faceplate recess 70. The icon elements 140 may be molded in various colors and may include a pattern that represents a particular type of device or peripheral such as a telephone, facsimile, computer, etc. Removal slots 150a, 150b with an angled surface 155 may be provided on either side of the icon elements 140, and may accommodate the blade of a screwdriver or other tool to facilitate removal of the icon elements 140 from the recess 70. The dimensions of the icon elements 140 are preferably complementary to the dimensions of the recess 70, and, as illustrated, several icon elements 140 may be accommodated in a recess 70 associated with multiple ports. The corners of the icon elements 140 have chamfers 94 complementary to the chamfers 92 of the recess 70.

An icon element 140 may be retained in the recess 70 by any number of different latching or retention techniques. Illustrated by way of example in FIGS. 15 and 16, the back wall 134 of the recess 70 may be provided with apertures or holes 160 for accommodating a split ball retention element 170. As seen in FIG. 18, the diameter of the split ball 170 is slightly greater than the diameter of the hole 160 so that the split ball retention element 170 may retain the icon element 140 once inserted into the hole 160. The spherical shape of the split ball 170 promotes movement of the legs 172, 174 toward each other when the split ball 170 is pushed into or pulled out of the hole 160. Normally, however, the split ball 170 will retain the icon element 140 in the recess 70 once inserted therein. As will be evident from FIG. 15, a recess 70 that spans several ports may accommodate a similar plurality of different icon elements 140. In this embodiment of the invention, the icon element 140 will be disposed in the recess 70 instead of the label cover 10.

Figure 17:
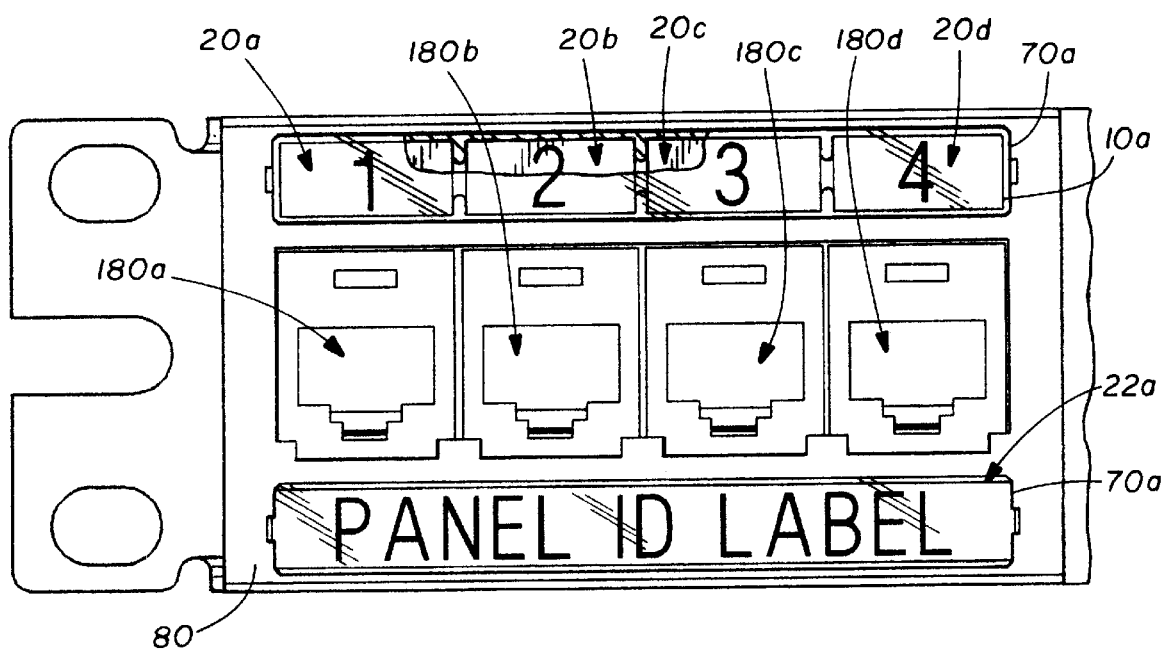
FIG. 17 is a front plan view of an embodiment of the present invention implemented in connection with a multiple port faceplate with a dual panel identification feature.

Turning now to FIG. 17, there is illustrated a faceplate 80 that includes a plurality of ports 180a, 180b, 180c and 180d, and an upper recess 70a located above the ports and a lower recess 70b located below the ports. In accordance with this embodiment of the invention, one of the two recesses may be used to accommodate a single identification label with identification information that may be common to the group of ports 180a, 180b, 180c and 180d, and the other recess may be used to accommodate a plurality of identification labels each having identification information pertaining to one of the ports 180a, 180b, 180c and 180d. For example, the lower recess 70b may accommodate a lower label cover 10b retaining a strip label 22a having identification information for the group of associated ports 180a, 180b, 180c and 180d. The upper recess 70a may accommodate an upper label cover 10a retaining a plurality of segment labels 20a, 20b, 20c and 20d, each having identification information corresponding to an associated port 180a, 180b, 180c and 180d.

Referring now to FIG. 18, there is another example illustrating use of the present invention that, similar to FIG. 17, demonstrates the great versatility of the present invention to accommodate a variety of different identification labeling requirements. The sloped faceplate 200 of FIG. 18 includes a first recess 70e that may contain strip label 22a that is utilized to identify the faceplate 200 itself, a second recess 70f that may contain another strip label 22a that is utilized to identify a first pair of ports 180e and 180f, a third recess 70g that may be utilized to identify a second pair of ports 180g and 180h, and a fourth recess 70h that may be used simply to retain a cover over a screw that may be securing the faceplate 200. The first recess 70e may retain a first label cover 10a that may retain label 22a or 22b.

Figure 12:
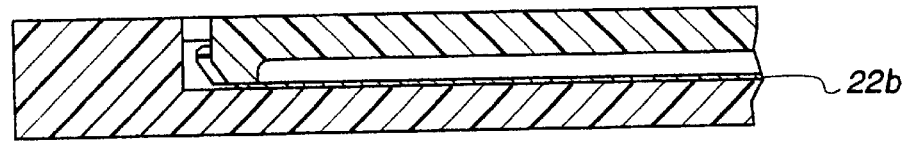
FIG. 12 is a cross-sectional view of the label cover and strip label of FIG. 11 when latched into a faceplate taken along section line 12—12.

Since the second recess 70f is associated with 2 ports 180e and 180f, the second label cover could be of the 2-segment variety (10) or of the strip label variety (10a), providing identification information, and is shown in FIG. 18 covering a printed strip label 22a for the corresponding ports 180e and 180f. While the third recess 70g is also associated with 2 ports 180g and 180h, similar to the second recess 70f, FIG. 12 illustrates the third recess 70g being used to accommodate two icon elements 140, each of which provides identification information for the corresponding port 180g and 180h. Finally, the fourth recess 70h is used to accommodate an opaque label cover 10 that is present merely to cover a screw that secures the faceplate panel 200. Of course, different labeling schemes could be used for each of the recesses 70e–70h of the faceplate panel 200 still in accordance with the present invention.

As will be appreciated from the foregoing detailed description, the present invention provides an improved and very versatile identification labeling system that can accommodate a variety of different identification label sizes and styles, including segment labels retained within a label cover, strip labels retained within a faceplate recess by the label cover or icon elements retained within a faceplate recess, as well as various combinations of the different label types and arrangements in one faceplate. The present invention also provides many advantages beyond versatility. For example, the label covers 10 and 10a remain flush with the panel surface, and the assembly of the present invention secures the identification information on the label and protects it from external elements.

The segment label embodiment of the present invention further has another significant advantage in that it allows for the segment labels to be removed, and new or different segment labels to be inserted, while the label cover is removed from the panel recess. This represents a significant advance over prior art techniques that require precise manual dexterity at a location (i.e., on the faceplate itself)

that may not be conveniently accessible. In other words, because the label cover of the present invention may be removed from the faceplate recess, the segment labels carried within may be removed, updated and inserted away from the vicinity of the recess on the panel. Furthermore, the recess itself and the chamfered corners of the label cover and the recess provide a convenient guide when attempting to manually insert the label cover into the recess when the faceplate is in a relatively inconvenient location. Moreover, the present invention further allows for complete printing and assembly of the label cover and labels offsite from the location of the panel. In this regard, an engineer or other individual responsible for configuring and setting up a system having many faceplates that need to be supplied with identification information may, in connection with configuring the system, which may also be performed offsite, print and conveniently insert the segment labels into appropriate label covers, substantially reducing the amount of onsite time it would otherwise take to configure and provide identification information for such a system.

What is claimed is:

1. An apparatus for identification labeling comprising:
   a faceplate having a generally rectangular recess of a predetermined depth,
   a generally rectangular label cover having a thickness substantially the same as the depth of the recess, said label cover comprising at least one compartment having a substantially open back side for retaining an identification label.

2. The apparatus of claim 1 wherein the corners of said generally rectangular label cover are chamfered and the corners of said generally rectangular recess are provided with a complementary chamfer.

3. The apparatus of claim 1 wherein said label cover has a plurality of compartments separated by at least one pair of transversely extending fingers which at least partially define said compartments.

4. The apparatus of claim 1 wherein said at least one compartment includes a pair of longitudinally extending opposed guide members that define a slot for retaining said identification label and wherein said guide members at least partially define said compartment.

5. The apparatus of claim 1 wherein said at least one compartment includes at least one internal transverse end surface that at least partially defines said compartment.

6. The apparatus of claim 1 wherein said label cover includes at least one latching leg and said recess includes at least one retention ledge that is complementary to said at least one latching leg for retaining said label cover within said recess.

7. The apparatus of claim 6 wherein said at least one latching leg includes a beveled surface for facilitating latching of said latching leg behind said at least one retention ledge.

8. The apparatus of claim 1 wherein said label cover has a protective shield that is substantially transparent.

9. The apparatus of claim 1 wherein said faceplate further comprises at least one groove substantially adjacent to said recess for accommodating the insertion of a tool to remove a label cover retained within the recess.

10. The apparatus of claim 1 wherein said recess includes a substantially closed endwall that prevents longitudinal movement of said label cover within said recess.

11. The apparatus of claim 1 wherein said recess further comprises a back wall having at least one aperture for accommodating at least one identification icon element with a retention latch.

12. The apparatus of claim 11 wherein said at least one identification icon element has a thickness which is substantially the same as the depth of said recess.

13. The apparatus of claim 11 wherein said at least one identification icon element includes at least one removal slot for accommodating the insertion of a tool to remove an icon element retained within the recess.

14. The apparatus of claim 1 wherein the recess has tapered corners and a strip label is fixed in position by the combination of the tapered corners and the rectangular label cover.

15. The apparatus of claim 14 wherein the label cover has a bottom wall and the bottom wall fixes the strip label in position.

16. The apparatus of claim 1 wherein the installed cover is flush with the surface of the faceplate.

17. A label cover for retaining at least one identification label, said label cover having predetermined dimensions and being adapted to be accommodated into a complementary recess of an item to be provided with an identification label, said label cover comprising:
   a generally flat and planar protective shield,
   at least one compartment defined by at least one generally transversely extending member limiting the longitudinal movement of a label retained within the compartment, the transversely extending member including a gap for accommodating a tool to remove a label retained within the defined compartment; and
   at least one longitudinally extending member limiting the transverse movement of a label retained within the compartment.

18. The label covers of claim 17 wherein said at least one longitudinally extending member comprises a pair of longitudinally extending opposed guide members spaced apart from said protective shield, thereby defining a slot for accommodating a label within a compartment.

19. The label cover of claim 17 wherein said label cover is generally rectangular in shape and further comprises at least one chamfered corner that is complementary with a chamfered corner of a recess within which the label cover may be retained.

20. The label cover of claim 17 further comprising latching means for latching the label cover into a recess within which the label cover may be retained.

21. The label cover of claim 20 wherein said latching means comprises at least one latching leg adapted to interact with a retention ledge disposed on a recess within which the label cover may be retained.

22. The label cover of claim 17 wherein said protective shield has light transmission characteristics selected from the group consisting of transparent, translucent opaque.

23. The label cover of claim 17 wherein said at least one transversely extending member and said at least one longitudinally extending member are generally planar and define a surface for retaining a label against a backwall of a recess within which said label cover may be retained.

24. An apparatus for identification labeling comprising:
   a faceplate having a generally rectangular recess of a predetermined depth,
   a generally rectangular label cover wherein the corners of said generally rectangular label cover are chamfered forming inner tapered corners and outer tapered corners, and the corners of said generally rectangular recess are provided with a complementary chamfer.

25. The apparatus of claim 24, wherein a first strip label having a first rectangular dimension is capable of being fixed in position by the combination of the inner tapered corners and the generally rectangular cover, and a second strip label having a second rectangular dimension is capable of being fixed in position by the combination of the outer tapered corners and the generally rectangular cover.

26. The apparatus of claim 24, wherein said label cover has a thickness substantially the same as the depth of the recess less the thickness of the label.

27. The apparatus of claim 24, wherein said label cover includes a plurality of latches disposed at each lateral end.

28. The apparatus of claim 27, wherein said recess includes a plurality of complementary retention ledges which are engaged by the cover latches.

29. An apparatus for identification labeling comprising:
   a faceplate having a recess of a predetermined depth said recess being formed by a bottom wall, a pair of endwalls, and a pair of sidewalls;
   a label disposed within the recess;
   a label cover,
   wherein a portion of the bottom wall of the recess contacts the sidewalls and the end walls so as to prevent the label from sliding behind the bottom wall.

30. The apparatus of claim 29, wherein said label cover has a thickness substantially the same as the depth of the recess less the thickness of the label.

31. The apparatus of claim 29, wherein said faceplate has a generally flat outer surface and an outer surface of said label eover is flush with the outer surface of the faceplate.

32. The apparatus of claim 29, wherein said label is the same color as the faceplate.

33. An apparatus for identification labeling comprising:
   a faceplate having a generally flat outer surface and including a recess of a predetermined depth;
   a label disposed within the recess; and
   a label cover having a thickness such that when the label cover is retaining the label within the recess an outer surface of the label cover is flush with the outer surface of the faceplate.

34. An apparatus for identification comprising:
   a faceplate having a recess of a predetermined depth;
   a label disposed within the recess; and
   a label cover, wherein said label is the same color as the faceplate.

35. An apparatus for identification labeling comprising:
   a faceplate having a generally rectangular recess of a predetermined depth, the recess having corners that are chamfered;
   a generally rectangular label cover having a thickness substantially the same as the depth of the recess and chamfered corners complementary to the corners of the recess, said label cover comprising at least one compartment for retaining an identification label.

36. An apparatus for identification labeling comprising:
   a faceplate having a generally rectangular recess of a predetermined depth,
   a generally rectangular label cover having a thickness substantially the same as the depth of the recess, said label cover having a plurality of compartments for retaining an identification label, the plurality of compartments separated by at least one pair of transversely extending fingers which at least partially define said compartments.

37. An apparatus for identification labeling comprising:
   a faceplate having a generally rectangular recess of a predetermined depth comprising a back wall having at least one aperture for accommodating at least one identification icon element with a retention latch; and
   a generally rectangular label cover having a thickness substantially the same as the depth of the recess, said label cover comprising at least one compartment for retaining an identification label.

38. The apparatus of claim 37 wherein said at least one identification icon element has a thickness which is substantially the same as the depth of said recess.

39. The apparatus of claim 37 wherein said at least one identification icon element includes at least one removal slot for accommodating the insertion of a tool to remove an icon element retained within the recess.

40. An apparatus for identification labeling comprising:
   a faceplate having a generally rectangular recess of a predetermined depth, the recess having tapered corners and a strip label fixed in position by the combination of the tapered corners and the rectangular label cover; and
   a generally rectangular label cover having a thickness substantially the same as the depth of the recess, said label cover comprising at least one compartment for retaining an identification label.

41. The apparatus of claim 40 wherein the label cover has a bottom wall and the bottom wall fixes the strip label in position.

42. A label cover for retaining at least one identification label, said label cover having predetermined dimensions and being adapted to be accommodated into a complementary recess of an item to be provided with an identification label, said label cover comprising:
   a generally flat and planar protective shield,
   at least one compartment defined by at least one generally transversely extending member limiting the longitudinal movement of a label retained within the compartment, and a pair of longitudinally extending opposed guide members spaced apart from said protective shield, thereby defining a slot for accommodating and limiting the transverse movement of, a label retained within a compartment.

43. A label cover for retaining at least one identification label, said label cover being generally rectangular in shape and having at least one chamfered corner that is complementary with a chamfered corner of a recess, within which the label cover may be retained, of an item to be provided with an identification label, said label cover comprising:
   a generally flat and planar protective shield,
   at least one compartment defined by at least one generally transversely extending member limiting the longitudinal movement of a label retained within the compartment, and at least one longitudinally extending member limiting the transverse movement of a label retained within the compartment.

44. A label cover for retaining at least one identification label, said label cover having predetermined dimensions and being adapted to be accommodated into a complementary recess of an item to be provided with an identification label, said label cover comprising:
   a generally flat and planar protective shield;
   at least one compartment defined by at least one generally planar, generally transversely extending member limiting the longitudinal movement of a label retained within the compartment; and
   at least one generally planar, longitudinally extending member limiting the transverse movement of a label retained within the compartment,
   wherein the transversely extending and longitudinally extending members define a surface for retaining a label against a backwall of a recess within which said label cover may be retained.

* * * * *